Patented June 9, 1942

2,285,570

UNITED STATES PATENT OFFICE 2,285,570

PRESSURE-SENSITIVE ADHESIVE

Corliss F. Cummins and Kenneth D. Bacon, Midland, Mich., assignors to The Dow Chemical Company, Midland, Mich., a corporation of Michigan No Drawing. Application March 2, 1940,
Serial No. 322,010

9 Claims. (Cl. 260—36)

This invention relates to new and improved pressure-sensitive adhesive compositions as well as to adhesive sheet material coated with the new compositions.

Among the various known types of pressure-sensitive adhesive compositions, those which are thermoplastic or capable of being melted have been found to be particularly suited for use in the manufacture of adhesive sheets, tapes, tabs, etc., because of the ease and economy by which they may be applied to the sheet base material by hot melt coating methods without the use of solvents. The thermoplastic pressure-sensitive adhesives heretofore known, however, comprise a plurality of essential ingredients, and accordingly are not entirely satisfactory from the point of view of simplicity of composition, ease of manufacture, and cost. For example, in U. S. Patent No. 2,142,039 are described a number of such compositions comprising as essential ingredients, a cohesive agent, an adhesive agent, a plasticizer, and a modifier. A typical composition of this type consists of rubber, polyisobutylene, amorphous wax, ester gum, and hydroquinone.

It is an object of this invention to provide simple and readily prepared pressure-sensitive adhesive compositions comprising a minimum number of essential ingredients. Another object is to provide improved adhesive compositions which are suitable for application directly to a suitable base material without the use of solvents to form an adhesive sheet or tape which can be attached to objects and surfaces by pressure alone and which can readily be removed therefrom without marring or soiling the same and without damaging the adhesive coating. Other objects will be apparent from the following detailed description of the invention.

We have found that the foregoing and related objects may be attained in compositions consisting essentially of polystyrene and certain organic phosphates having viscosities between about 25 and about 300 centipoises at 60° C. Such compositions are inexpensive and are readily prepared, and comprise but two essential ingredients. They are sufficiently thermoplastic that when heated to temperatures of 100°–180° C. they may readily be applied to a backing sheet of paper, Cellophane, or the like, by a doctor roll or blade without the use of solvents. They have excellent adhesive and cohesive properties so that a sheet coated therewith may be caused to adhere tenaciously to any suitable surface of glass, wood, metal, etc., by mere pressure, but may readily be stripped or peeled from such surface without soiling the same and without tearing the adhesive coating from the sheet.

The organic phosphates having viscosities between about 25 and about 300 centipoises at 60° C. which are employed in preparing our new adhesive compositions are for the most part liquid triaryl phosphates, although liquid mixtures of the same may also be employed. The triaryl phosphates of the present class and their liquid mixtures are substantially colorless, non-volatile, and non-toxic, are stable to light and heat, and are compatible with polystyrene over a wide range of proportions. Examples of such compounds are di-phenyl mono-o-xenyl phosphate, di-carvacryl mono-(6-chloro-2-xenyl) phosphate, di-p-tertiarybutylphenyl mono-phenyl phosphate, phenyl 4-tertiarybutylphenyl 2-xenyl phosphate, di-o-xenyl mono-phenyl phosphate, di-phenyl mono-(6-chloro-2-xenyl) phosphate, di-(4-tertiarybutylphenyl) mono-4-tertiarybutyl-2-methylphenyl phosphate, etc. Also, suitably viscous liquid mixtures of triaryl phosphates, for example, a mixture of tri-o-xenyl phosphate, which is a crystalline solid, and tri-o-chlorophenyl phosphate, may be employed.

The proportions in which the polystyrene and triaryl phosphate ingredients are employed in preparing the new adhesive compositions depend somewhat upon the particular triaryl phosphate as well as upon the degree of adhesion and cohesion desired in the composition. Ordinarily, however, the use of from about 1.5 to about 6 parts by weight of the triaryl phosphate per part of polystyrene will be found to give satisfactory results. Thus, compositions consisting of but these two ingredients contain approximately 15–40 per cent by weight of polystyrene and approximately 85–60 per cent of the triaryl phosphate. For any particular triaryl phosphate the optimum percentage is from about 30 to about 45 per cent in excess of its threshold percentage, the latter value being defined as the lowest concentration at which the triaryl phosphate imparts flexibility to polystyrene. Thus, in a composition consisting of polystyrene and di-phenyl mono-o-xenyl phosphate (threshold percentage=33%), the optimum proportion will be found to be from about 63 to about 78 per cent of di-phenyl mono-o-xenyl phosphate and from about 22 to about 37 per cent of polystyrene.

The new compositions are prepared simply by heating with stirring a mixture of the triaryl phosphate and the polystyrene, at a temperature of approximately 120°–200° C. until complete solution is effected. Additional ingredients, e. g.

dyes or pigments, may be added before, during, or after the heating. The compositions so prepared may be applied directly to any base sheet material which does not appreciably absorb the triaryl phosphate from the composition by means of a heated doctor roll or blade in accordance with well-known hot melt coating procedure. Among such suitable base sheet materials may be mentioned cellulosic materials, such as paper, cardboard, cloth, etc., casein, regenerated cellulose (Cellophane), and cellulose esters, such as cellulose acetate, cellulose acetobutyrate, etc. Regenerated cellulose is particularly adapted to be employed in the manufacture of transparent adhesive tapes. As hereinbefore mentioned, such adhesive tapes are caused to adhere firmly to any clean, dry surface merely by pressing against such surface but may readily be removed therefrom without damaging either the tape or the surface.

The following examples illustrate several ways in which the principle of the invention has been applied but are not to be construed as limiting the same:

Example 1

| | Per cent |
|---|---|
| Polystyrene | 30 |
| Di-phenyl mono-o-xenyl phosphate | 70 |

This composition was prepared by heating a mixture of 30 parts by weight of granular polystyrene and 70 parts by weight of the phosphate at a temperature of about 150° C. with stirring until a clear solution was obtained. This composition was then applied as a hot melt at a temperature of about 120° C. to a film of regenerated cellulose to form a transparent adhesive tape. The latter had excellent adhesive properties, but could be stripped cleanly from surfaces to which it had been applied, and reused.

Example 2

| | Per cent |
|---|---|
| Polystyrene | 25 |
| Di-o-xenyl mono-phenyl phosphate | 75 |

This composition was prepared by heating 25 parts by weight of polystyrene with 75 parts of the phosphate at a temperature of about 160° C. until the polystyrene was completely dissolved. It had good adhesion to a cellulosic film base and could be applied thereto as a hot melt at a temperature of about 120° C. without the use of solvents.

Example 3

| | Per cent by weight |
|---|---|
| Polystyrene | 27 |
| Di-(4-tertiarybutylphenyl) mono-phenyl phosphate | 73 |

This composition was prepared as in Example 2 and was very similar in properties to the composition therein described.

Example 4

| | Per cent by weight |
|---|---|
| Polystyrene | 25 |
| Di-phenyl mono-(6-chloro-2-xenyl) phosphate | 75 |

This composition was similar to that described in Example 1.

While the above examples describe only compositions consisting of the essential ingredients, polystyrene and suitably viscous triaryl phosphates, it is to be understood that certain non-essential ingredients may be included for the purpose of modifying the appearance or physical properties of the new compositions. Thus, for example, dyes or pigments may be incorporated into compositions which are to be employed in the manufacture of decorative adhesive sheets and like. Similarly, inert fillers, such as wood flour, may be employed for modifying the adhesive properties of the composition.

Other modes of applying the principle of our invention may be employed instead of those explained, change being made as regards the ingredients employed, provided the composition stated by any of the following claims or the equivalent of such stated composition be obtained.

We claim:

1. A thermoplastic pressure-sensitive adhesive composition essentially comprising polystyrene and from about 1.5 to about 6 parts by weight thereof of an adhesive agent selected from the class consisting of triaryl phosphates and mixtures thereof, said agent having a viscosity between about 25 and about 300 centipoises at a temperature of 60° C.

2. A thermoplastic pressure-sensitive adhesive composition consisting essentially of from about 15 to about 40 per cent by weight of polystyrene and from about 85 to about 60 per cent by weight of an adhesive agent selected from the class consisting of triaryl phosphates and mixtures thereof, said agent having a viscosity between about 25 and about 300 centipoises at a temperature of 60° C.

3. A thermoplastic pressure-sensitive adhesive composition consisting essentially of from about 15 to about 40 per cent by weight of polystyrene and from about 85 to about 60 per cent by weight of di-phenyl mono-o-xenyl phosphate.

4. A thermoplastic pressure-sensitive adhesive composition consisting essentially of from about 15 to about 40 per cent by weight of polystyrene and from about 85 to about 60 per cent by weight of di-o-xenyl mono-phenyl phosphate.

5. A thermoplastic pressure-sensitive adhesive composition consisting essentially of from about 15 to about 40 per cent by weight of polystyrene and from about 85 to about 60 per cent by weight of di-phenyl mono-(6-chloro-2-xenyl) phosphate.

6. A pressure-sensitive adhesive sheet material comprising a base sheet coated with the composition defined by Claim 1, said sheet being of a material which does not appreciably absorb the adhesive agent from said composition.

7. A transparent pressure-sensitive adhesive sheet material comprising a base sheet of transparent regenerated cellulose coated with the composition defined by claim 1.

8. A transparent pressure-sensitive adhesive sheet material comprising a base sheet of a cellulose ester coated with the composition defined by claim 1.

9. A transparent pressure-sensitive adhesive sheet material comprising a base sheet of a cellulosic material coated with the composition defined by claim 1.

CORLISS F. CUMMINS.
KENNETH D. BACON.